US006638696B1

(12) United States Patent
Donovan

(10) Patent No.: US 6,638,696 B1
(45) Date of Patent: Oct. 28, 2003

(54) GLOW-IN-THE DARK DISPLAY ELEMENT

(75) Inventor: Kevin M. Donovan, Bergen, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/196,596

(22) Filed: Jul. 16, 2002

(51) Int. Cl.⁷ .............................. G03C 1/06; G03C 1/40; G03C 1/46; G03C 1/825; G03C 5/42
(52) U.S. Cl. ..................... 430/364; 430/432; 430/434; 430/21; 430/139; 430/503; 430/510; 430/512; 430/519; 430/520; 430/521; 430/522; 430/523; 430/508; 430/933
(58) Field of Search ................... 430/21, 139, 364, 430/503, 508, 523, 572, 522, 510, 517, 519, 520, 521, 432, 434, 933

(56) References Cited

U.S. PATENT DOCUMENTS

| | | |
|---|---|---|
| 1,543,931 A | 6/1925 | Law |
| 2,382,806 A | 8/1945 | Motson |
| 2,460,221 A | 1/1949 | Gordon |
| 2,887,379 A | 5/1959 | Blake et al. |
| 3,107,138 A | 10/1963 | LeMassena |
| 3,801,324 A * | 4/1974 | Postal |
| 3,879,611 A | 4/1975 | Schroeder |
| 3,910,793 A * | 10/1975 | Peisach |
| 4,122,237 A | 10/1978 | Kaiserman ................ 428/195 |
| 4,543,308 A | 9/1985 | Schumann et al. ......... 430/139 |
| 4,745,286 A | 5/1988 | Jones ..................... 250/459.1 |
| 4,865,944 A * | 9/1989 | Roberts et al. ............. 430/495 |
| 5,350,650 A * | 9/1994 | Gasper et al. ............... 430/21 |
| 5,965,242 A | 10/1999 | Patton et al. ............... 428/195 |
| 5,972,590 A * | 10/1999 | Friour et al. ............... 430/933 |
| 6,071,855 A | 6/2000 | Patton et al. ............... 503/227 |
| 6,440,649 B1 * | 8/2002 | Simpson et al. ........... 430/139 |
| 6,509,126 B1 * | 1/2003 | Whitesides et al. .......... 430/21 |

* cited by examiner

Primary Examiner—Richard L. Schilling
(74) Attorney, Agent, or Firm—Sarah Meeks Roberts

(57) ABSTRACT

This invention provides a display element comprising a support, a phosphorescent material, and at least one layer containing a silver halide emulsion, wherein the phosphorescent material is not excited upon exposure of the silver halide emulsion. It further provides methods of exposing and processing such display elements.

30 Claims, No Drawings

GLOW-IN-THE DARK DISPLAY ELEMENT

FIELD OF THE INVENTION

This invention relates to producing a photographic image that may be, upon excitation with ambient light, visible in the dark. The photographic image is developed on a display element that contains at least one silver halide emulsion layer and a phosphorescent material.

BACKGROUND OF THE INVENTION

U.S. Pat. No. 4,543,308 describes a photosensitive photographic recording material which contains at least one layer comprising photosensitive silver halide and at least one compound capable of luminescence, whereby the recording material is exposed imagewise and developed resulting in a silver image and a latent luminescent image superimposed on the silver image. U.S. Pat. No. 3,107,138 describes a recording oscillograph in which the recording medium includes silver halide in combination with one or more fluorescent, phosphorescent, and/or heat sensitive materials. By this means a record is obtained which becomes immediately visible due to the action of the fluorescent, phosphorescent, or heat sensitive material and which record remains permanently visible due to the action of the silver halide. There is additionally a large body of patent literature which describes radiographic elements which contain phosphorescent materials or comprise phosphor screens; however, the purpose of the phosphorescent materials in the radiographic elements is to expose the silver halide upon excitation by x-rays. None of these photographic materials are intended for use as glow-in-the-dark materials. Rather, the fluorescent or phosphorescent materials are excited by the electromagnetic radiation used to expose the silver halide.

U.S. Pat. No. 4,745,286 discloses a self-supporting sheet of phosphorescent material, suitable for subsequent use as wallpaper, capable of producing a photographic image that will glow in the dark. The exposure necessary for creating the latent image in an emulsion layer, however, may cause excitation of the phosphorescent layer and thereby result in unwanted exposure to the emulsion. The result is a poorer quality photographic image. U.S. Pat. Nos. 6,071,855 and 5,965,242 describe a medium comprising a phosphorescent layer having a phosphorescent material and an image receiving layer disposed over the phosphorescent layer. The image receiving layer is substantially translucent and capable of retaining an image from a digital printer, more specifically an inkjet printer. These two patents do not involve a silver halide system.

It is still desired to provide a glow-in-the-dark display material that has a high quality photographic image.

SUMMARY OF THE INVENTION

This invention provides a display element comprising a support, a phosphorescent material, and at least one layer containing a silver halide emulsion, wherein the phosphorescent material is not excited upon exposure of the silver halide emulsion. In one embodiment this invention provides a display element comprising a support, a phosphorescent material, and at least one layer containing a silver halide emulsion, wherein the display element also comprises a filter dye which absorbs electromagnetic energy at wavelengths which excite the phosphorescent material, said filter dye being contained in a layer above the phosphorescent material. In another embodiment this invention provides a display element comprising a support, a phosphorescent material, and at least one layer containing a silver halide emulsion, wherein the silver halide emulsion is primarily sensitive to electromagnetic energy at wavelengths which do not excite the phosphorescent material.

This invention also provides a method of exposing and processing a display element which will glow in the dark comprising providing a display element comprising a support, a phosphorescent material, and at least one layer containing a silver halide emulsion; wherein said display element also comprises a filter dye which filters electromagnetic energy at wavelengths which excite the phosphorescent material, said filter dye being contained in a layer above the phosphorescent material; exposing said photographic element to form a latent image; and processing said exposed photographic element in a manner which will develop the latent image and remove the filter dye. It further provides a method of exposing and processing a display element which will glow in the dark comprising providing a display element comprising a support, a phosphorescent material, and a layer containing a silver halide emulsion, said silver halide emulsion being primarily sensitive to electromagnetic energy at wavelengths which do not excite the phosphorescent material; exposing said photographic element to a light source which will cause the silver halide emulsion to form a latent image but which will not excite the phosphorescent material; and processing said exposed photographic element in a manner which will develop the latent image.

This invention provides a novel photographic print media capable of being viewed in the dark after excitation of the phosphor(s). Said image is improved over the prior art by reducing the unwanted exposure to the emulsion from the excited phosphor(s), thereby resulting in a sharper image. The display element of the invention provides a novel photographic print media that can be used in current photographic print systems. In one embodiment the phosphor(s) are coated onto a support without admixing into the support material. This allows for use of a common support for various types of display materials and limits any negative interaction between the support components and the phosphorescent material.

DETAILED DESCRIPTION OF THE INVENTION

The display element of the invention comprises a support, a phosphorescent material, and at least one layer containing a silver halide emulsion, and meets the criteria that the phosphorescent material is not substantially excited upon exposure of the silver halide emulsion to form a latent image. This minimizes unwanted exposure to the photographic emulsion due to phosphorescence and results in a sharper image. This may be accomplished in one of two main fashions. The first is to use filter dyes as a means to avoid excitation of the phosphor(s) during the photographic exposure. The second is to use photographic emulsions sensitized to electromagnetic energy bands that will not excite the phosphor layer to create the photographic image.

In the following discussion, the term "above" will mean closer to any intended source of electromagnetic energy used to expose the silver halide emulsion, and the term "below" will mean further from any intended source of electromagnetic energy used to expose the silver halide emulsion. The phosphorescent material may be contained in either the support or in a layer above or below the support. It is anticipated that generally the phosphorescent material will be contained in either the support or in a layer above the support (i.e., between the support and the intended source of exposure), particularly when the support of the display element is opaque. However, in the situation where the support is transparent, the phosphorescent material may also be contained in a layer below or behind the support, i.e., the support is between the phosphorescent material and the intended exposure source. From the intended use of the display material it will be clear to those skilled in the art that any layers of the display material which are between the layer comprising the phosphorescent material and any intended viewer of the glow-in-the-dark display will be translucent or transparent so as not to interfere with the glow-in-the-dark effect.

Preferably the phosphorescent material is contained in a layer separate from the support. The separate layer containing the phosphorescent material preferably also contains a binder such as gelatin or some other polymer, or a mixture thereof. The gelatin may be any number of commercially available gelatins that are well known to those skilled in the art. The polymer may be AQ55, available from Eastman Chemical Corporation. Another polymer may be an acrylic latex such as NEOCRYL A5090 obtained from NeoResins (a division of Avecia). Amounts of the phosphor and thickness of the phosphor layer are dependent on the material and the desired effect. Typically the amount of phosphorescent material ranges from 50 to 375 mg/m$^2$ with a layer thickness from 0.01 mm to 0.2 mm. This layer may also contain other components known to those skilled in the art such as thickeners, cross-linkers, surfactants, biocides, hardeners, antistatic materials, or various coating aides.

The display element comprises at least one layer containing a silver halide emulsion. There may be more than one layer which contains a silver halide emulsion, and each layer may contain several different silver halide emulsions. The silver halide emulsion layer(s) is preferably positioned in a layer above the phosphorescent material, i.e., between the layer comprising the phosphorescent material and the intended exposure source, although it is contemplated that the phosphorescent material could be contained in the silver halide emulsion layer.

The phosphorescent material is preferably excited by ambient light, either daylight or artificial room lighting. Generally the phosphorescent material is primarily excited by electromagnetic energy having a wavelength of 200 nm to 450 nm. Examples of suitable phosphorescent materials include inorganic sulfides, including oxides thereof; inorganic silicates, including oxides thereof; or inorganic aluminates, including oxides thereof. Other suitable phosphorescent materials will be known to those skilled in the art. Examples of some particularly preferred phosphorescent materials include europium doped alkaline earth metal silicate oxide, a europium doped earth metal aluminate oxide, a doped earth metal sulfide, or a doped inorganic sulfide. Specific examples of suitable phosphorescent material include (ZnS:Ag), (CaS:Eu,Cu), (CaSrS:Bi), (CaSrS:Br$^{3+}$), (CaAl$_2$O$_4$:Eu$^2$,Nd$^{3+}$), (ZnS:Cu,Co), (SrAl$_2$O$_4$:Eu$^{2+}$,Dy$^{3+}$), (CaS:Eu$^{2+}$,Tm$_{3+}$). The emissions of the phosphorescent material may also be modified by luminescent pigments or dyes contained in the display element.

As described above, in one embodiment the silver halide emulsion or emulsions are primarily sensitive to electromagnetic energy at wavelengths which do not excite the phosphorescent material. The term "primarily" indicates that the silver halide may have some sensitivity to other wavelengths but that it will be fully exposed within a commercially acceptable time period utilizing only electromagnetic energy at wavelengths which do not excite the phosphorescent material. It is recognized that there may be some slight sensitivity of the phosphorescent material at these wavelengths, but it will not be enough to cause unwanted exposure of the silver halide emulsion. Preferably the silver halide emulsion(s) is primarily sensitive to wavelengths greater than 450 nm, and more preferably, the silver halide emulsion(s) is primarily sensitive to light energy at 450 nm to 750 nm. It is specifically contemplated that sensitizing dyes may be utilized to sensitize the silver halide emulsions as desired. Such sensitizing dyes are well known in the art and are discussed in the *Research Disclosures* as noted below. In one embodiment the layer structure may be as shown below.

---

Silver Halide Emulsion Layer (sensitive to 450 nm to 750 nm)
Layer Containing Phosphorescent Material (Sensitive to 200 nm to 450 nm)
Support

---

The silver halide emulsions utilized in this invention may be comprised of, for example, silver chloride, silver bromide, silver bromoiodide, silver bromochloride, silver iodochloride, silver bromoiodochloride, and silver iodobromochloride enulsions. The silver halide emulsions are preferably predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride. For this embodiment the display element is exposed to a light source which will cause the silver halide emulsion to form a latent image but which will not excite the phosphorescent material. For example, masks or filters may be used when the display element is exposed. The display element is then processed in a manner which will develop the latent image.

In the second embodiment described above the display element also comprises a filter dye that absorbs energy at electromagnetic wavelengths which excite the phosphorescent material. The purpose of the filter dye is to prevent the electromagnetic energy being used to expose the silver halide from also exciting the phosphorescent material, thereby minimizing unwanted exposure of the silver halide. This method may be particularly useful in that any light source and any silver halide emulsion may be utilized. The filter dye is contained in a layer above the phosphorescent material, i.e., between the phosphorescent material and the intended exposure source. The filter dye may be located in a layer above the silver halide emulsion layer(s) or in a layer between the phosphorescent material and the silver halide emulsion layer(s). In another embodiment the filter dye is contained in the silver halide emulsion layer(s); with the proviso that in this embodiment the phosphorescent material cannot be contained in the silver halide emulsion layer(s). When a filter dye is used to filter electromagnetic energy that would excite the phosphorescent material, the filter dye must be removed during processing in order to get the glow-in-the-dark effect for the final printed image. Methods of removing filter dyes are known to those skilled in the art and are discussed in the *Research Disclostires* noted below. In this embodiment one example of the layer structure is shown below:

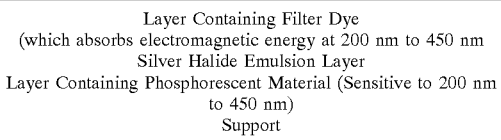

| Layer Containing Filter Dye |
| (which absorbs electromagnetic energy at 200 nm to 450 nm |
| Silver Halide Emulsion Layer |
| Layer Containing Phosphorescent Material (Sensitive to 200 nm |
| to 450 nm) |
| Support |

The filter dyes that may be utilized are any of the suitable dyes known to those skilled in the art. Filter dyes have attained widespread use in imaging elements. These dyes are used to reduce or eliminate the amount or intensity of radiation of a specific wavelength or range of wavelengths from reaching one or more radiation sensitive layers. Filter dyes used in imaging elements are discussed in the *Research Disclosures* noted below and in U.S. Pat. No. 5,834,173 and U.S. Pat. No. 6,214,499, which are hereby incorporated by reference. In one preferred embodiment the filter dye absorbs electromagnetic energy having a wavelength of less than 450 nm. For example, the filter dye may be derived from an arylidene dye, a coumarin dye, an oxonol dye, a merocyanine dye, a cyanine dye, a styryl dye, an azo dye, a hemioxonol dye, a metal-chelate dye, a triarylmethane dye, an indoaniline dye, a chalcone dye, an anthraquinone dye, or a butadiene dye. The dye(s) should be present in amounts sufficient to absorb unwanted radiation. This depends on the particular dye and desired application. Useful ranges include 0.5 to 1000 mg/m$^2$. The amounts of filter dye that may be utilized are very dye dependent. For the specific filter dye shown below a suitable amount is 10 mg/ft$^2$. One particularly suitable filter dye is represented by the structure

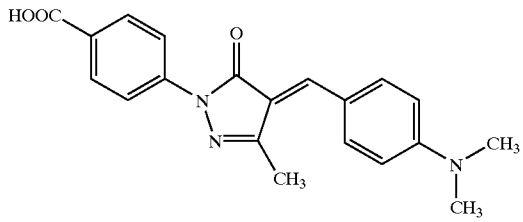

It is contemplated that the predominantly silver chloride emulsions may take the form of a variety of morphologies including those with cubic, tabular and, tetradecahedral grains with {111} and {100} crystal faces. The grains may take the form of any of the naturally occurring morphologies of cubic lattice type silver halide grains. Further, the grains may be irregular such as spherical grains. Additionally, these emulsions may contain iodides or bromides of less than 10% of the total halide composition.

The grains can be contained in any conventional dispersing medium capable of being used in photographic emulsions. Specifically, it is contemplated that the dispersing medium be an aqueous gelatino-peptizer dispersing medium, of which gelatin—e.g., alkali treated gelatin (cattle bone and hide gelatin) or acid treated gelatin (pigskin gelatin) and gelatin derivatives—e.g., acetylated gelatin, phthalated gelatin, and the like are specifically contemplated. When used, gelatin is preferably at levels of 0.01 to 100 grams per total silver mole The photographic elements of the invention can be black-and-white elements, including metallic silver or chromogenic black-and-white elements, single color elements, or multicolor elements. Black-and-white elements may be more suitable only because a color image may not show up as well as a "black-and-white" image. The supports utilized in this invention are generally reflective supports such as are known in the art, although transparent supports may be utilized as noted above. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

If desired, the photographic element can be used in conjunction with an applied magnetic layer as described in *Research Disclosure*, November 1992, Item 34390 published by Kenneth Mason Publications, Ltd., Dudley Annex, 12a North Street, Emsworth, Hampshire PO10 7DQ, ENGLAND, the contents of which are incorporated herein by reference In the following Table, reference will be made to (1) *Research Disclosure*, December 1978, Item 17643, (2) *Research Disclosure*, December 1989, Item 308119, (3) *Research Disclosure*, September 1994, Item 36544, and (4) *Research Disclosure*, September 1996, Item 38957, all published by Kenneth Mason Publications, Ltd., Dudley Annex, 12a North Street, Emsworth, Hampshire PO10 7DQ, ENGLAND, the disclosures of which are incorporated herein by reference. The Table and the references cited in the Table are to be read as describing particular components suitable for use in the elements of the invention. The Table and its cited references also describe suitable ways of preparing, exposing, processing and manipulating the elements, and the images contained therein. High chloride photographic elements and methods of processing such elements particularly suitable for use with this invention are described in *Research Disclosure*, February 1995, Item 37038, in Research Disclosure, September 1997, Item 40145 and, of particular interest, *Research Disclosure*, September 2000, Item 437013 published by Kenneth Mason Publications, Ltd., Dudley Annex, 12a North Street, Emsworth, Hampshire PO10 7DQ, ENGLAND, the disclosures of which are incorporated herein by reference.

| Reference | Section | Subject Matter |
|---|---|---|
| 1 | I, II | Grain composition, |
| 2 | I, II, IX, X, XI, XII, XIV, XV | morphology and preparation. Emulsion preparation |
| 3 & 4 | I, II, III, IX A & B | including hardeners, coating aids, addenda, etc. |
| 1 | III, IV | Chemical sensitization and |
| 2 | III, IV | spectral sensitization/ |

-continued

| Reference | Section | Subject Matter |
| --- | --- | --- |
| 3 & 4 | IV, V | desensitization |
| 1 | V | UV dyes, optical brighteners, |
| 2 | V | luminescent dyes |
| 3 & 4 | VI | |
| 1 | VI | Antifoggants and stabilizers |
| 2 | VI | |
| 3 & 4 | VII | |
| 1 | VIII | Absorbing and scattering |
| 2 | VIII, XIII, XVI | materials; Antistatic layers; |
| 3 & 4 | VIII, IX C & D | matting agents |
| 1 | VII | Image-couplers and image- |
| 2 | VII | modifying couplers; Wash-out |
| 3 & 4 | X | couplers; Dye stabilizers and hue modifiers |
| 1 | XVII | Supports |
| 2 | XVII | |
| 3 & 4 | XV | |
| 3 & 4 | XI | Specific layer arrangements |
| 3 & 4 | XII, XIII | Negative working emulsions; Direct positive emulsions |
| 2 | XVIII | Exposure |
| 3 & 4 | XVI | |
| 1 | XIX, XX | Chemical processing; |
| 2 | XIX, XX, XXII | Developing agents |
| 3 & 4 | XVIII, XIX, XX | |
| 3 & 4 | XIV | Scanning and digital processing procedures |

The photographic elements may utilize any traditional support known to those skilled in the art. One conventional photographic quality paper comprises cellulose paper with polyethylene resin waterproof coatings. The support may also consist of a multilayer film of biaxially oriented polyolefin which is attached to both the top and bottom of a photographic quality paper support by melt extrusion of a polymer tie layer. The biaxially oriented films may contain a plurality of layers in which at least one of the layers contains voids. The voids provide added opacity to the imaging element. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image. These supports are described in more detail in U.S. Pat. Nos. 5,866,282; 5,888,681; 6,030,742; 6,030,759; 6,107,014; and 6,153,351. Such biaxially oriented films may also be utilized for display materials having translucent or transparent supports.

The photographic elements comprising the radiation sensitive high chloride emulsion layers can be conventionally optically printed, or can be image-wise exposed in a pixel-by-pixel mode using suitable high energy radiation sources typically employed in electronic printing methods. Suitable actinic forms of energy encompass the ultraviolet, visible, and infrared regions of the electromagnetic spectrum, as well as electron-beam radiation, and is conveniently supplied by beams from one or more light emitting diodes or lasers, including gaseous or solid state lasers. Exposures can be monochromatic, orthochromatic, or panchromatic. For example, when the recording element is a multilayer multicolor element, exposure can be provided by laser or light emitting diode beams of appropriate spectral radiation, for example, infrared, red, green, or blue wavelengths, to which such element is sensitive. Multicolor elements can be employed which produce cyan, magenta, and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18, and 23.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$, and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100 $\mu$seconds, often up to 10 $\mu$seconds, and frequently up to only 0.5 $\mu$seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al, *A Continuous-Tone Laser Color Printer*, Journal of Imaging Technology, Vol. 14, No. 3, June 1988, which is hereby incorporated herein by reference. A description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

The photographic elements can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye. With negative-working silver halide, the processing step described above provides a negative image. In one embodiment the described elements can be processed in the known color print processes such as the RA-4 process of Eastman Kodak Company, Rochester, N.Y. The invention may also be utilized with black-and-white processing chemistry. For example, the described elements can be tray processed using available Black-and-White processing chemistries such as DEKTOL, EKTAFLO, or POLYMAX T developers, stop baths, and fixers from the Eastman Kodak Company, Rochester, N.Y., to create an image with elemental silver.)

The following examples illustrate the practice of this invention. They are not intended to be exhaustive of all possible variations of the invention. Parts and percentages are by weight unless otherwise indicated.

EXAMPLES

Example 1

The phosphor ZnS:Cu was dispersed in gelatin at 25% phosphor and 10% gelatin. The material was coated with a blade onto paper support at 10 to 44 g ZnS:Cu/m². This media was then overcoated with an emulsion most sensitive to 700 nm at 27 g Ag/m². From the resulting photographic media a contact print was prepared by placing a mask over the print media and exposing to wavelengths of greater than 600 nm. A black-and-white print was created after development of the latent image, using Kodak RA-12 Developer, and fixing of the unexposed silver with Kodak C41 Fixer followed by a water rinse. Said black-and-white print became visible in dark conditions after the phosphor layer was exposed to room light.

The invention has been described in detail with particular reference to certain preferred embodiments thereof, but it will be understood that variations and modifications can be effected within the spirit and scope of the invention.

What is claimed is:

1. A display element comprising a support, a phosphorescent material, and at least one layer containing a silver halide emulsion, wherein the phosphorescent material is not excited upon exposure of the silver halide emulsion and wherein, after development of the display element, the phosphorescent material will glow in the dark after excitation by ambient light.

2. The display element of claim 1 wherein the silver halide emulsion layer(s) is positioned above the phosphorescent material.

3. The display element of claim 1 wherein the support is opaque and the phosphorescent material is contained in either the support or in a layer above the support.

4. The display element of claim 1 wherein the support is transparent and the phosphorescent material is contained in either the support or in a layer below the support.

5. The display element of claim 1 wherein the phosphorescent material is contained in a layer above the support.

6. The display element of claim 1 wherein the phosphorescent material is excited by ambient light.

7. The display element of claim 1 wherein the phosphorescent material is primarily excited by electromagnetic energy having a wavelength of 200 nm to 450 nm.

8. The display element of claim 1 wherein the phosphorescent material is an inorganic sulfide, inorganic silicate, or inorganic aluminate.

9. The display element of claim 1 wherein the phosphorescent material is a europium doped alkaline earth metal silicate oxide, a europium doped earth metal aluminate oxide, a doped earth metal sulfide, or a doped inorganic sulfide.

10. The display element of claim 1 further comprising a luminescent pigment or dye.

11. The display element of claim 1 wherein the phosphorescent material is (ZnS:Ag), (CaS:Eu,Cu), (CaSrS:Bi), (CaSrS;Br$^{3+}$), (CaAl$_2$O$_4$:Eu$^2$,Nd$^{3+}$), (ZnS:Cu,Co), (SrAl$_2$O$_4$:Eu$^{2+}$,Dy$^{3+}$), or (CaS:Eu$^{2+}$,Tm$^{3+}$).

12. The element material of claim 5 wherein the layer containing the phosphorescent material further comprises a binder.

13. The display element of claim 1 wherein the silver halide emulsion is a high chloride emulsion.

14. The display element of claim 1 wherein the silver halide emulsion is primarily sensitive to electromagnetic energy of wavelengths which do not excite the phosphorescent material.

15. The display element of claim 14 wherein the silver halide emulsion is primarily sensitive to wavelengths greater than 450 nm.

16. The display element of claim 14 wherein the silver halide emulsion is primarily sensitive to light energy at 450 nm to 750 nm.

17. The display element of claim 1 wherein said display element also comprises a filter dye which absorbs energy at electromagnetic wavelengths which excite the phosphorescent material, said filter dye being contained in a layer above the phosphorescent material.

18. The display element of claim 17 wherein the filter dye is located in a layer above the silver halide emulsion layer(s).

19. The display element of claim 17 wherein the filter dye is located in a layer between the phosphorescent material and the silver halide emulsion layer(s).

20. The display element of claim 17 wherein the filter dye is contained in the silver halide emulsion layer(s).

21. The display element of claim 17 wherein the filter dye is derived from an arylidene dye, a coumarin dye, an oxonol dye, a merocyanine dye, a styryl dye, an azo dye, a hemioxonol dye, a metal-chelate dye, a triarylmethane dye, an indoaniline dye, a chalcone dye, an anthraquinone dye, or a butadiene dye.

22. The display element of claim 17 wherein the filter dye is represented by the structure

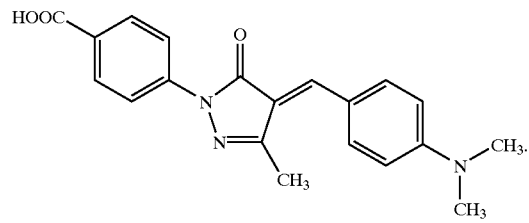

23. The display element of claim 17 wherein the filter dye absorbs energy having a wavelength of less than 450 nm.

24. A method of exposing and processing a display element which will glow-in-the-dark comprising providing a display element comprising a support, a phosphorescent material, and at least one layer containing a silver halide emulsion, wherein said display element also comprises a filter dye which filters electromagnetic energy at a wavelength which excites the phosphorescent material, said filter dye being contained in a layer above the phosphorescent material; exposing said photographic element to form a latent image; and processing said exposed photographic element in a manner which will develop the latent image and remove the filter dye.

25. The method of claim 24 wherein the display element is exposed with a laser.

26. The method of claim 24 wherein the silver halide emulsion layer(s) is positioned above the phosphorescent material.

27. A method of exposing and processing a display element which will glow in the dark comprising providing a display element comprising a support, a phosphorescent material, and a layer containing a silver halide emulsion, said silver halide emulsion being primarily sensitive to electromagnetic energy at wavelengths which do not excite the phosphorescent material; exposing said photographic element to a light source which will cause the silver halide emulsion to form a latent image but which will not excite the phosphorescent material; and processing said exposed photographic element in a manner which will develop the latent image.

28. The method element of claim 27 wherein the silver halide emulsion layer(s) is positioned above the phosphorescent material.

29. A display element comprising a support, a phosphorescent material, and at least one layer containing a silver halide emulsion, wherein the display element also comprises a filter dye which absorbs energy at electromagnetic wavelengths which excite the phosphorescent material, said filter dye being contained in a layer above the phosphorescent material.

30. A display element comprising a support, a phosphorescent material, and at least one layer containing a silver halide emulsion, wherein the silver halide emulsion is primarily sensitive to electromagnetic energy at wavelengths which do not excite the phosphorescent material and wherein, after development of the display element, the phosphorescent material will glow in the dark after excitation by ambient light.

* * * * *